United States Patent
Pallister et al.

(10) Patent No.: US 11,635,966 B2
(45) Date of Patent: Apr. 25, 2023

(54) PAUSING EXECUTION OF A FIRST MACHINE CODE INSTRUCTION WITH INJECTION OF A SECOND MACHINE CODE INSTRUCTION IN A PROCESSOR

(71) Applicant: Graphcore Limited, Bristol (GB)

(72) Inventors: James Pallister, Bristol (GB); Jamie Hanlon, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/336,060

(22) Filed: Jun. 1, 2021

(65) Prior Publication Data
US 2022/0012061 A1    Jan. 13, 2022

(30) Foreign Application Priority Data

Jul. 10, 2020   (GB) .................................... 2010703

(51) Int. Cl.
*G06F 11/22*   (2006.01)
*G06F 11/263*   (2006.01)
*G06F 9/38*   (2018.01)

(52) U.S. Cl.
CPC ........ *G06F 9/3855* (2013.01); *G06F 11/2236* (2013.01); *G06F 11/263* (2013.01)

(58) Field of Classification Search
CPC ... G06F 9/3855; G06F 11/2236; G06F 11/263
See application file for complete search history.

(56) References Cited

U.S. PATENT DOCUMENTS 5,179,702 A * 1/1993 Spix ...................... G06F 9/3838
                                                         717/124
5,872,910 A * 2/1999 Kuslak ................ G06F 11/2236
                                                         714/E11.166

(Continued)

FOREIGN PATENT DOCUMENTS

EP       3916544 A1 * 12/2021  ........... G06F 9/3838
JP    2006351008 A  * 12/2006  ......... G06F 9/30079

(Continued)

OTHER PUBLICATIONS

Combined Search and Examination Report dated Apr. 13, 2021 for United Kingdom Patent Application No. GB2010703.3. 8 pages.

*Primary Examiner* — Joseph O Schell
*Assistant Examiner* — Indranil Chowdhury
(74) *Attorney, Agent, or Firm* — Haynes and Boone, LLP

(57) ABSTRACT

Aspects of the present disclosure provide a processor having: an execution unit configured to execute machine code instructions, at least one of the machine code instructions requiring multiple cycles for its execution; instruction memory holding instructions for execution, wherein the execution unit is configured to access the memory to fetch instructions for execution; an instruction injection mechanism configured to inject an instruction into the execution pipeline during execution of the at least one machine code instruction fetched from the memory; the execution unit configured to pause execution of the at least one machine code instruction, to execute the injected instruction to termination, to detect termination of the injected instruction and to automatically recommence execution of the at least one machine code instruction on detection of termination of the injected instruction.

29 Claims, 10 Drawing Sheets

(56) References Cited

U.S. PATENT DOCUMENTS

| | | | | |
|---|---|---|---|---|
| 6,076,159 | A * | 6/2000 | Fleck | G06F 9/3855 |
| | | | | 712/213 |
| 6,279,100 | B1 * | 8/2001 | Tremblay | G06F 9/30141 |
| | | | | 712/E9.046 |
| 7,320,063 | B1 * | 1/2008 | Grohoski | G06F 9/3851 |
| | | | | 712/214 |
| 11,175,950 | B1 * | 11/2021 | Yang | G06F 9/3838 |
| 2003/0093655 | A1 * | 5/2003 | Gosior | G06F 9/30167 |
| | | | | 712/228 |
| 2006/0288192 | A1 * | 12/2006 | Abernathy | G06F 9/3802 |
| | | | | 712/214 |
| 2013/0086367 | A1 * | 4/2013 | Gschwind | G06F 9/3832 |
| | | | | 712/E9.016 |
| 2016/0179533 | A1 * | 6/2016 | Gramunt | G06F 9/384 |
| | | | | 712/207 |
| 2019/0121638 | A1 * | 4/2019 | Knowles | G06F 9/4887 |
| 2019/0121641 | A1 * | 4/2019 | Knowles | G06F 9/3009 |
| 2019/0121668 | A1 * | 4/2019 | Knowles | G06F 9/3851 |
| 2019/0121679 | A1 * | 4/2019 | Wilkinson | G06F 9/30087 |
| 2019/0121680 | A1 * | 4/2019 | Wilkinson | G06F 9/3851 |
| 2019/0121785 | A1 * | 4/2019 | Wilkinson | G06F 15/80 |
| 2019/0155768 | A1 * | 5/2019 | Wilkinson | G06F 13/4282 |
| 2020/0065095 | A1 | 2/2020 | Underwood | |
| 2020/0133680 | A1 | 4/2020 | Bertone | |
| 2020/0201636 | A1 * | 6/2020 | Alexander | G06F 9/4887 |
| 2020/0201652 | A1 | 6/2020 | Alexander | |
| 2020/0210301 | A1 * | 7/2020 | Nandan | G06F 11/2236 |
| 2020/0210365 | A1 * | 7/2020 | Wilkinson | G06F 9/30145 |
| 2020/0225960 | A1 * | 7/2020 | Alexander | G06F 9/3861 |
| 2021/0089418 | A1 * | 3/2021 | Das Sharma | G06F 11/221 |
| 2021/0374895 | A1 * | 12/2021 | Rudnicki | G06F 8/4442 |

FOREIGN PATENT DOCUMENTS

| | | | | |
|---|---|---|---|---|
| KR | 20210005719 A | * | 1/2021 | G06F 9/3009 |
| KR | 20210003267 A | * | 11/2021 | G06F 9/4881 |
| WO | WO-2007093199 A2 | * | 8/2007 | G03B 13/18 |
| WO | WO-2013006566 A2 | * | 1/2013 | G06F 9/30087 |

* cited by examiner

PAUSING EXECUTION OF A FIRST MACHINE CODE INSTRUCTION WITH INJECTION OF A SECOND MACHINE CODE INSTRUCTION IN A PROCESSOR

CROSS-REFERENCE TO RELATED-APPLICATIONS

The present application claims priority to United Kingdom Patent Application No. 2010703.3, filed on Jul. 10, 2020, the disclosure of which is hereby incorporated herein by reference in its entirety.

TECHNICAL FIELD

The present disclosure is directed to handling injected instructions in a processor.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general purpose memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus, each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. However, this requires a great deal of duplication in term s of hardware.

Instead, another form of multi-threaded processor is one in which the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

One form of parallelism can be achieved by means of a processing system comprising an arrangement of multiple tiles on the same chip (i.e. same die), each tile comprising its own separate respective execution unit and memory (including program memory and data memory). Thus, separate portions of program code can be run in parallel on different ones of the tiles. The tiles are connected together via an on-chip interconnect which enables the code run on the different tiles to communicate. In some cases, the processing unit on each tile may itself run multiple concurrent threads on-tile, each tile having its own respective set of contexts and corresponding pipeline as described above in order to support interleaving of multiple threads on the same tile through the same pipeline.

Due to their highly embedded nature and program complexity, particular challenges arise in the debugging of such processors.

When debugging a processor, one technique is to cause predetermined instructions to be executed and monitor the outcomes. Such instructions may be referred to as "debug" instructions. In some scenarios, they may be 'injected' into an execution unit on the processor. For example, this may be done when the processor is in a debug mode, or when an exception has been raised, and the processor is in an excepted state. Once the injected instructions have been executed, the processor may be returned from a debug or excepted mode to an operational mode. This may be achieved by an externally provided control signal for example.

SUMMARY

The present disclosure addresses the challenge of enabling instructions to be injected into an execution unit without the need to explicitly enter a debug mode, and to enable continued execution of program instructions without explicitly controlling the processor to resume a normal operational state.

Certain embodiments address the challenges of debugging a multitile, multithreaded processing system by providing a hardware configurable mechanism for allowing interrogation or debugging of a tile while a multicycle instruction is executing.

Aspects of the present disclosure provide a processor comprising:
an execution unit configured to execute machine code instructions, at least one of the machine code instructions requiring multiple cycles for its execution;
instruction memory holding instructions for execution, wherein the execution unit is configured to access the memory to fetch instructions for execution;
an instruction injection mechanism configured to inject an instruction into the execution pipeline during execution of the at least one machine code instruction fetched from the memory;
the execution unit configured to pause execution of the at least one machine code instruction, to execute the injected instruction to termination, to detect termination of the injected instruction and to automatically recommence execution of the at least one machine code instruction on detection of termination of the injected instruction.

In some embodiments, the at least one machine code instruction is configured to enter an operational wait state after at least a first cycle of execution to await an execution condition for further execution.

The instructions for execution may comprise a plurality of worker threads for execution in a respective one of a plurality of time slots and a supervisor thread, wherein the supervisor thread comprises the at least one of the machine code instructions.

The at least one machine code instruction may comprise a synchronisation instruction which issues a synchronisation request when the execution condition is determined.

The at least one machine code instruction may comprise a synchronisation instruction which defines a local mode in which the execution condition comprises termination of a set of worker threads currently being executed in respective timeslots.

In some embodiments, the processor is configured to transmit the synchronisation request to one or more other processors and to await receipt of a synchronisation acknowledgement signal.

In some embodiments, the execution unit is configured to adopt an injection wait state when the execution of the at least one machine code instruction has been paused and to set an indicator to indicate a paused state.

In some embodiments the execution unit is configured on detection of termination of the injected instruction to reset the indicator to a ready state.

In some embodiments, the execution unit is configured to monitor the indicator and to automatically recommence execution of the at least one machine code instruction when it determines that the indicator is in the ready state.

The instruction injection mechanism may be configured to inject a debugging instruction for debugging the processor.

The debugging instruction may be configured, when executed by the execution unit, to record execution state associated with at least one instruction executed by the execution unit.

Another aspect of the present disclosure provides a method of executing instructions in a processor comprising:
fetching an instruction from a memory of the processor, the instruction requiring multiple cycles for its execution;
commencing execution of the fetched instruction in an execution unit of the processor;
receiving in the execution unit an injected instruction;
pausing execution of the fetched instruction;
executing the injected instruction to termination;
detecting termination of the injected instruction; and
automatically recommencing execution of the fetched instruction on detection of termination of the injected instruction.

In some embodiments, in one of the cycles of execution of the fetched instruction, a fetched instruction enters an operational wait state to await an execution condition for further execution.

In some embodiments, while execution of the fetched instruction is paused, the paused instruction is caused to adopt an injection wait state to await detection of termination of the injected instruction.

The method may comprise setting an indicator to indicate the paused state.

The method may comprise on detection of termination of execution of the injected instruction, resetting the indicator to indicate a ready state and automatically recommencing execution of the fetched instruction when the indicator is determined to be in the ready state.

Another aspect of the disclosure provides a processing system comprising a plurality of processors and an interconnect for communicating between the processors, wherein:

each processor comprises an execution unit for executing machine code instructions, including at least one machine code instruction requiring multiple cycles for its execution;
the interconnect is operable to conduct communications between a group of some or all of the processors according to a bulk synchronous parallel scheme whereby each of the processors in said group performs a local compute phase followed by an inter-processor exchange phase with the exchange phase being held back until all the processors in said group have completed the compute phase, wherein the at least one machine code instruction comprises a synchronisation instruction for execution by each processor in the group upon completion of its compute phase;
wherein the execution unit is configured:
to pause execution of the synchronisation instruction to execute an instruction which has been injected into the execution unit;
to detect termination of execution of the injected instruction; and
to automatically recommence execution of the synchronisation instruction on detection of termination of the injected instruction.

The processing system may comprise a debug interface configured to inject a debug instruction into the execution unit during execution of the synchronisation instruction.

Each processor may comprise:
multiple context register sets, each context register set arranged to store a program state of a respective of multiple threads; and
a scheduler arranged to schedule the execution of a respective one of a plurality of worker threads in each of a plurality of timeslots wherein the program state of each of the worker threads is stored in a respective one of the context register sets, wherein according to the bulk synchronous parallel scheme, the exchange phase is held back until all the worker threads on all the processors in the group have issued a synchronisation request to indicate that they have completed the compute phase.

The processing system may be such that the exchange phase is arranged to be performed by a supervisor thread separate to the worker threads, wherein the supervisor thread comprises the synchronisation

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

The following describes components of a processing system having an architecture which has been developed to address issues arising in the computations involved in machine intelligence applications. The processing system described herein may be used as a work accelerator, that is, it receives a workload from an application running on a host computer, the workload generally being in the form of very large data sets to be processed (such as the large experience data sets used by a machine intelligence algorithm to learn a knowledge model, or the data from which to perform a prediction or inference using a previously-learned knowledge model). An aim of the architecture presented herein is to process these very large amounts of data highly efficiently. The processor architecture has been developed for processing workloads involved in machine intelligence. Nonetheless, it will be apparent that the disclosed architecture may also be suitable for other workloads sharing similar characteristics.

Such an architecture comprises multiple processors (or tiles) on a single die or chip. When executing different portions of a program over multiple tiles, it may be required to perform a barrier synchronization to bring multiple tiles to a common point of execution. There are different synchronisation schemes, one of which is discussed later. In brief, a bulk synchronous parallel (BSP) scheme enables a synchronisation to be provided to separate a compute phase from an exchange phase. In this scheme, synchronisation may be achieved by issuing a synchronisation request when a tile has completed its own compute phase. This can be done by issuing a synchronisation instruction on that tile.

The present disclosure addresses challenges of inspecting/debugging tiles in a multiple, multithreaded processor architecture using a hardware configurable mechanism. The following describes a processor architecture which includes a dedicated instruction in its instruction set for performing a barrier synchronization. First, however, an example processor in which this may be incorporated is described with reference to FIGS. 1 to 4.

Figure 1:
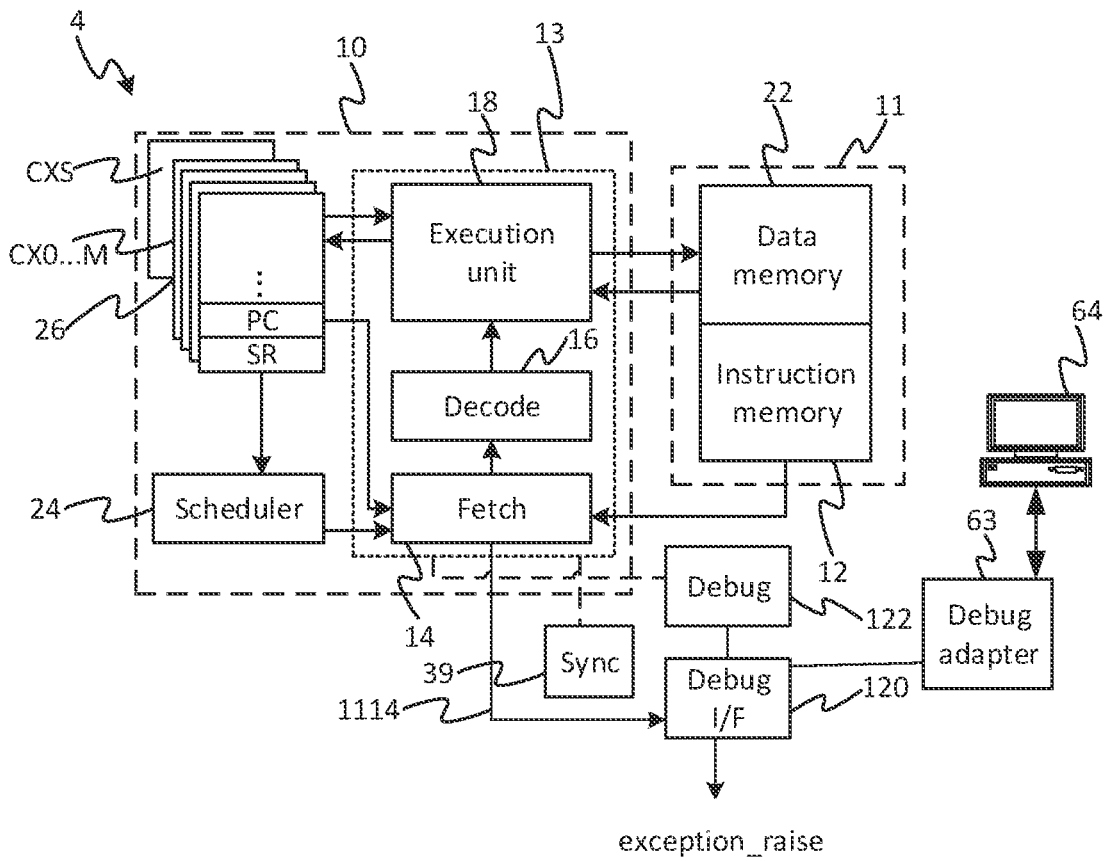
FIG. 1 is a schematic block diagram of a multi-threaded processing unit.

FIG. 1 illustrates an example of a processor module 4 in accordance with embodiments of the present disclosure. Herein, the term 'processor' and 'processor module' may be used interchangeably. For instance, the processor module 4 may be one tile of an array of like processor tiles on a same chip, or may be implemented as a stand-alone processor on its own chip. The processor module 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. Note that not all of the worker threads need be codelets (atomic), and in embodiments some or all of the workers may instead be able to communicate with one another.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register tiles 26 comprises a respective set of registers for representing the program state of a respective thread.

The tile also has a debug interface 120 and a set of debug hardware 122 described later. The debug interface may also connect to an external debug adapter 63 which can access registers in the debug interface. The debug adapter 63 is exposed to the address space of the registers of the debug interface via a memory map. The debug adapter may be coupled to a user terminal to enable a human user to control the debug adapter.

Figure 3:
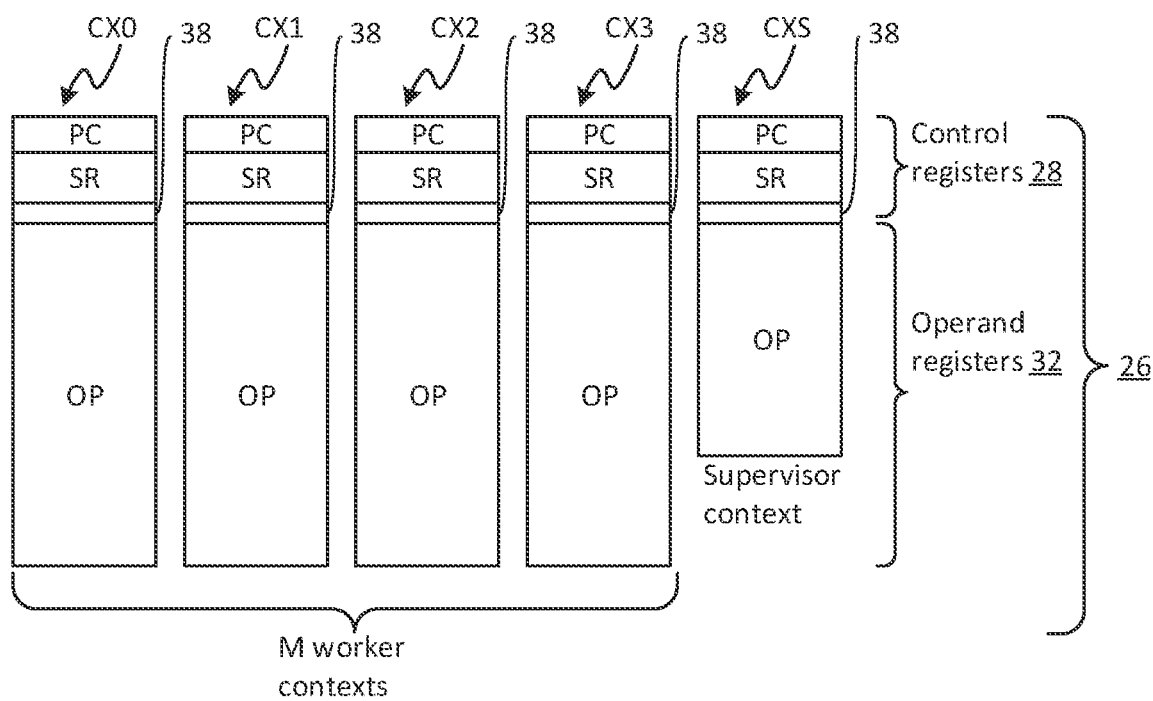
FIG. 3 is a schematic block diagram of a plurality of thread contexts.

An example of the registers making up each of the context register files 26 is illustrated schematically in FIG. 3. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

As will be discussed in more detail later, the disclosed arrangement has one worker context register file CX0 . . . CX(M−1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments the supervisor context may have fewer operand registers than each of the workers, Examples of operand registers the worker context may have that the supervisor does not include: floating point registers, accumulate registers, and/or dedicated weight registers (for holding weights of a neural network). In embodiments the supervisor may also have a different number of status registers. Further, in embodiments the instruction set architecture of the processor module 4 may be configured such that the worker threads and supervisor thread(s) execute some different types of instruction but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 2:
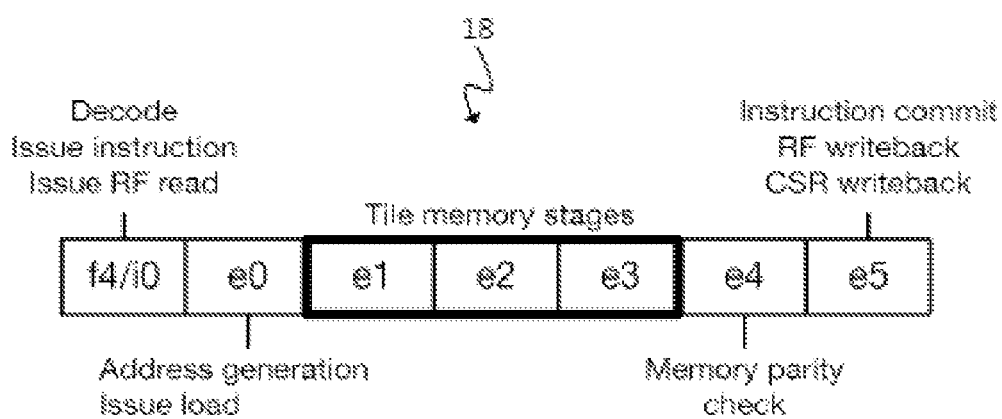
FIG. 2 is a schematic view of an execution pipeline.

FIG. 2 shows stages of the execution pipeline 18 in accordance with examples described herein. These execution stages define where the functional behaviour of an instruction occurs. A prior stage f4/i0 represents decode and issue of instructions into the pipeline 18. Address generation and memory access for loads, stores and sends are issued in stage e0. Note that 'send' is an instruction to access data from memory and transmit it from the tile. Stages e1, e2 and e3 are referred to as to the memory stages. Accesses to the memory are pipelined over four stages, an input stage, a RAM macro, an output stage for the RAM macro and a final output stage. However, the pipeline depth is referred to as three stages since it does not introduce logic before the first stage (taking input from e0) or after the last stage (providing output to e4). In stage e4 of the pipeline there is a memory parity check and loads are picked up. All execution is speculative until stage e5 where, in the absence of exceptions, state updates are committed back to the context register files.

Each of the first four contexts CX0 . . . CX3 is used to represent the state of a respective one of a plurality of "worker threads" currently assigned to one of four execution time slots S0 . . . S3, for performing whatever application-specific computation tasks are desired by the programmer (note again this may only be subset of the total number of worker threads of the program as stored in the instruction memory 12). The fifth context CXS however, is reserved for a special function, to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. According to the present embodiments the supervisor thread has additional coordinating responsibilities. The supervisor thread is responsible for performing barrier synchronisations to ensure a certain order of execution. E.g. in a case where one or more second threads are dependent on data to be output by one or more first threads run on the same processor module 4, the supervisor may perform a barrier synchronization to ensure that none of the second threads begin until the first threads have finished. In addition to, or instead of this first example, the supervisor may perform a barrier synchronization to ensure that one or more threads on the processor module 4 do not begin until a certain external source of data, such as another tile or processor chip, has completed the processing required to make that data available. The supervisor thread may also be used to perform other functionality relating to the multiple worker threads. For example, the supervisor thread may be responsible for communicating data externally to the processor module 4 (to receive external data to be acted on by one or more of the threads, and/or to transmit data output by one or more of the worker threads). In general the supervisor thread may be used to provide any kind of overseeing or coordinating function desired by the programmer. For instance as another example, the supervisor may oversee transfer between the tile local memory 12 and one or more resources in the wider system (external to the array 6) such as a storage disk or network card.

The supervisor thread SV does not have its own time slot per se in the scheme of interleaved time slots. When a given slot is allocated to the supervisor, that slot instead uses the context register file CVS of the supervisor. Note that the supervisor always has access to its own context and no workers are able to occupy the supervisor context register file CXS. However, the supervisor cannot read any of the context registers CX0 . . . of the workers.

Once launched, each of the currently allocated worker threads W0 . . . W3 proceeds to perform the one or more computation tasks defined in their code. At the end of this, the respective worker thread then hands the time slot in which it is running back to the supervisor thread. This is achieved by executing an exit instruction ("EXIT").

The EXIT instruction takes at least one operand and preferably only a single operand, exit_state (e.g. a binary value), to be used for any purpose desired by the programmer to indicate a state of the respective codelet upon ending (e.g. to indicate whether a certain condition was met):

EXIT exit_state

The EXIT instruction acts on the scheduler 24 so that the time slot in which it is executed is returned back to the supervisor thread. The supervisor thread can then perform one or more subsequent supervisor tasks (e.g. barrier synchronization and/or exchange of data with external resources such as other tiles).

Figure 4:
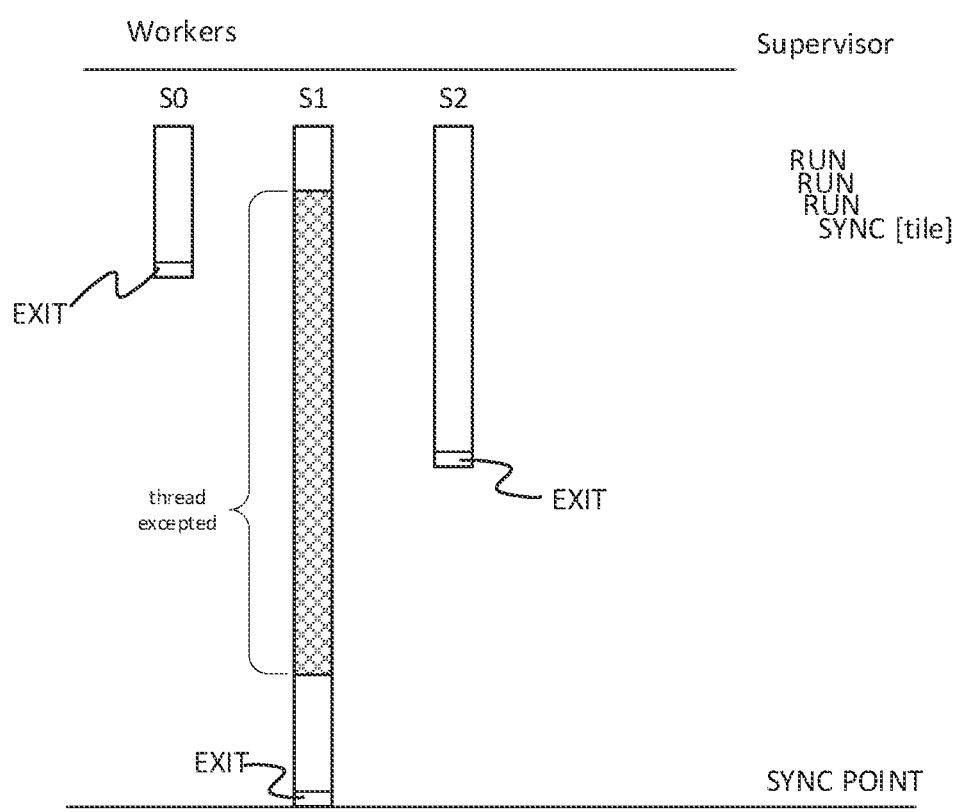
FIG. 4 schematically illustrates synchronization amongst worker threads on the same tile.

Referring to FIG. 4, in embodiments a SYNC (synchronization) instruction is provided in the processor's instruction set. The SYNC instruction can operate in different modes, including a local mode and an external mode. In the local mode, he SYNC instruction has the effect of causing the supervisor thread SV to wait until all currently executing workers W have exited by means of an EXIT instruction. In embodiments the SYNC instruction takes the mode as an operand (in embodiments its only operand), the mode specifying whether the SYNC is to act only locally (local mode) in relation to only those worker threads running locally on the same processor module 4, e.g. same tile, as the supervisor as part of which the SYNC is executed on (i.e. only threads through the same pipeline 13 of the same barrel-threaded processing unit 10); or whether instead (external mode) it is to apply across multiple tiles or even across multiple chips. The behaviour of SYNC instructions is driven by a finite state machine (FSM) in the e5 pipeline stage. It is situated in this stage so that the status of worker contexts is established, where this is done in the e4 pipeline stage from the point of view of the SYNC instruction (e5 from the point of view of the exiting worker). Each SYNC mode is controlled by a FSM which defines the behaviour of the SYNC instruction for that mode.

SYNC mode//mode ∈{tile, chip, zone_1, zone_2}

For the purposes of FIG. 4 a local SYNC will be assumed ("SYNC tile", i.e. a synchronization within a single tile).

The workers do not need to be identified as operands of the SYNC instruction, as it is implicit that the supervisor SV is then caused to automatically wait until none of the time slots S0, S1, . . . of the barrel-threaded processing unit 10 is occupied by a worker. As shown in FIG. 4, once each of a current batch of workers WLn have all been launched by the supervisor, the supervisor then executes a SYNC instruction. If the supervisor SV launches workers W in all the slots S0 . . . 3 of the barrel-threaded processing unit 10 (all four in the example illustrated, but that is just one example implementation), then the SYNC will be executed by the supervisor once the first of the current batch of worker threads WLn has exited, thus handing back control of at least one slot to the supervisor SV. Otherwise if the workers do not take up all of the slots, the SYNC will simply be executed immediately after the last thread of the current batch WLn has been launched. Either way, the SYNC causes the supervisor SV to wait for all others of the current batch of workers WLn−1 to execute an EXIT before the supervisor can proceed. This waiting by the supervisor thread is imposed in hardware once the SYNC has been executed. I.e. in response to the opcode of the SYNC instruction, the FSM in the execution pipeline within the unit (EXU) of the execution stage 18 causes the fetch stage 14 and scheduler 24 to pause from issuing instructions of the supervisor thread until all outstanding worker threads have executed an EXIT instruction.

SYNC instructions may take many cycles to execute since the instruction has to wait for each of the workers to become inactive in order to complete. The SYNC instruction may wait indefinitely, if a worker fails to finish executing. Supervisor exceptions may be raised during a SYNC instruction. One example of an exception that may be raised during a SYNC instruction to allow debugging to be carried out is a BREAK_on_Sync exception, described below. However, it is also possible to carry out debugging of the supervisor context without requiring a BREAK_on_Sync exception, by injecting a debug instruction. A mechanism is later described to allow execution of injected instructions during a SYNC instruction by pausing the SYNC instruction and assigning the supervisor to a specific wait state until the instruction has completed, at which point the SYNC instruction resumes. This mechanism can be used to debug the supervisor context without raising an exception.

BREAK_on_Sync

Figure 5:
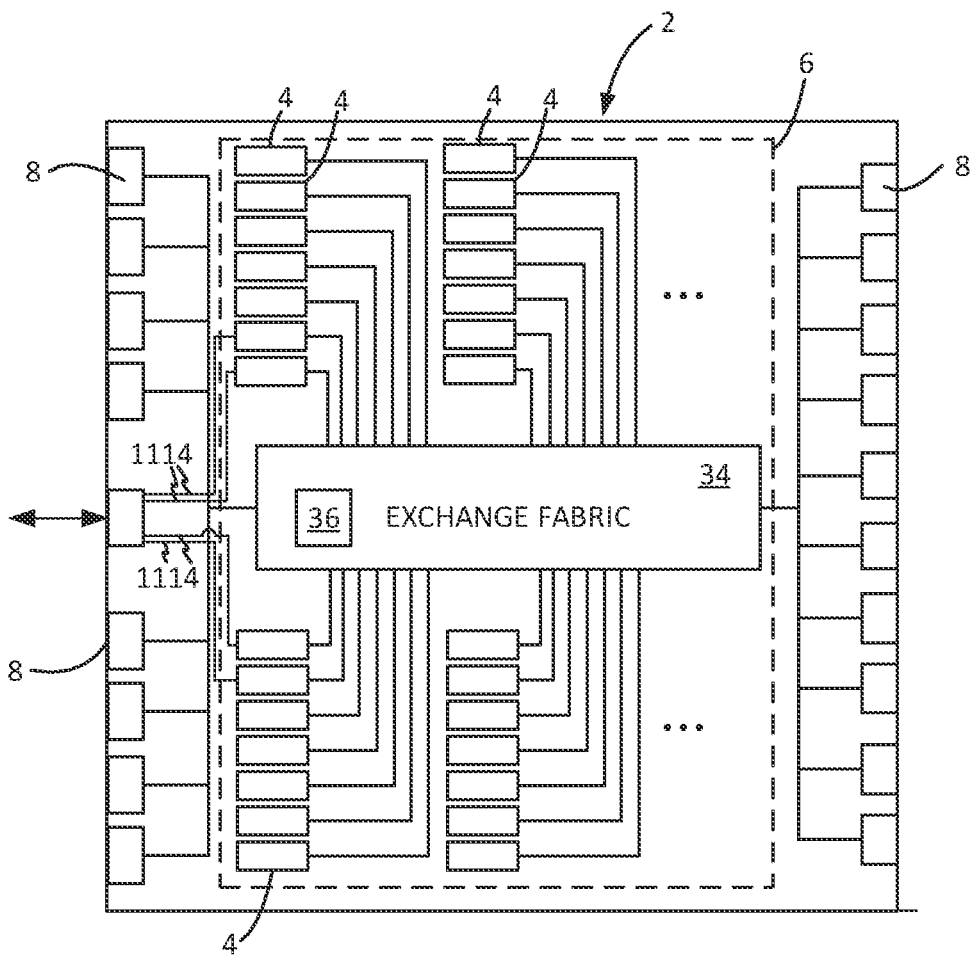
FIG. 5 is a schematic block diagram of a processor chip comprising multiple tiles.

FIG. 5 illustrates schematically an example architecture of a computer (processing system) comprising a plurality of tiles 4. Aspects of the computer shown in the example of FIG. 5 are described in more detail later, but for the present time the debugging aspect will be described. As already mentioned, each tile has a debug interface 120 (not shown in FIG. 5) which allows access to the tile through a computer debug interface 1118 on the computer.

The debug adapter 63 can access any tile via this computer debug interface 1118. Different mechanisms can be used to enable access by the tool to the tile, but the main function is a read from architectural state on the tile and/or inject instructions.

The present disclosure addresses the need to debug processors and processing systems, in particular in the context of instructions which may not have a predetermined number of cycles to completion after they are fetched for execution. One possibility is to enable such a multicycle instruction to raise its own break point in certain scenarios, but this has the restriction that once the breakpoint has been raised, the computer is in an excepted state. Debug exceptions may be cleared by writing to a special register. The possibility of a multi cycle instruction raising its own exception is described below for the sake of completeness prior to describing the improvements of the present embodiments.

A BREAK_on_Sync event is triggered when the supervisor executes a SYNC instruction and a break on sync flag is set on the tile. If the flag is not set, the SYNC instruction executes as normal, as described herein. If the flag is set, then a break exception event is raised whenever the supervisor context executes a SYNC instruction (for either internal or external SYNC zones). The break exception event is only raised once all of the worker contexts are inactive, but before the SYNC instruction initiates its synchronisation handshake in external mode. The tile therefore will be in a suspended or stalled state because it has not generated a sync request, and therefore will not receive a SYNC ack. However, other tiles on the chip can continue to process their workloads until such time as they have all reached their SYNC points. While that is happening, state on the stalled tile can be inspected in the exception status register of the debug hardware 122 and exception register 38 of the context and possibly debugged.

Note also that when a worker context reaches a debug exception event, it will effectively stall until the exception event is cleared, and it will not reach its exit state. However, other worker contexts on the same tile will be unaffected. The consequence of a worker being stalled (and not getting to its exit instruction) is that when the other workers have issued their exit instructions, the tile will fail to sync because one worker context will be 'stalled'. However, individual threads and individual tiles can tolerate delays of this kind, because their operation is not dependent on completing programs within a certain time frame. Once the issue has been resolved, and the exception has been cleared, normal operation is resumed.

Reverting to the BREAK_on_Sync scenario, clearing down a BREAK_on_Sync event allows a tile to continue execution following a BREAK_on_Sync exception event. The exception event is cleared in the supervisor event clear register and the supervisor recommences execution. Supervisor execution will be restarted by resuming execution of the SYNC instruction, which will cause the SYNC request to be generated and initiate normal operation.

As explained above, the debug interface 120 on each tile supports the BREAK_on_Sync state configuration, and implements other debug features. The debug interface 120 provides a mechanism by which architectural state on the tile can be interrogated and modified by the external debug tool 63. Furthermore, the mechanism supports instruction breakpoint channels and data breakpoint channels. In addition, the debug interface enables the BREAK_on_Sync flag to be set.

Sync Injection Mechanism

The mechanism by which an instruction injected into the pipeline may be executed during a SYNC instruction is now described.

The debugger may comprise an off-chip debug adapter 63 which has the ability to write to registers in the debug interface 120. One such register is linked to the fetch unit IA, enabling the debug adapter to write an instruction to this register. The fetch unit is configured to fetch from this register in the debug interface 120 in the event of a switch to debug mode. In this way, the debug adapter can inject an executable machine code instruction that will be issued into the execution pipeline for debugging purposes.

Figure 6:
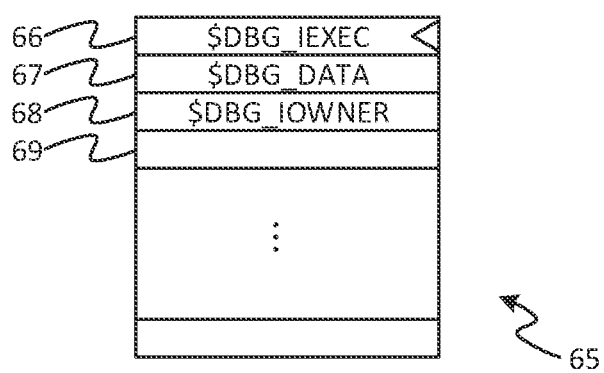
FIG. 6 is a schematic block diagram showing registers of a debug interface.

FIG. 6 shows the registers 65 of the debug interface 120 in accordance with examples described herein. The debug adapter 63 is able to write a machine code instruction to the debug instruction register 66 as it would a value to any other writeable register 65 in the debug interface 120. Thus, by coupling one such register to the instruction fetch unit 14, this enables the debug adapter 63 to inject a debug instruction into the pipeline 13.

Typically, the registers 65 in the debug interface 120 comprise at least one output register 69. This is the register into which the debug interface 120 copies values from other, internal registers of the processing module, such as the program state registers 26. As mentioned, the debug interface 120 is configured to be able to accept requests from the debug adapter 63, these requests including an identifier of an internal register 26 that the debug adapter 120 is requesting the value from (it cannot access these directly as it is only exposed to the interface registers 65 via the memory map, not all the internal state of the processing module 4). In response, the debug interface 120 retrieves the value currently held in the identified register 26 and places it in the output register 69 in the interface 120. The adapter 63 can then read the requested value from there, since it has access to the registers 65 in the interface 120. This in itself is a normal feature of a conventional debug interface 120 and adapter 63.

In embodiments, the registers 65 in the debug interface 120 may further comprise at least one debug data register 67 (SDBG_DATA). In embodiments this is a single register shared between all processor contexts and the debug adapter 63. It is readable and writeable by instructions (both injected and otherwise) as a "normal" CSR via put/get instructions. It is also directly readable and writeable by the debug adapter 63 via the debug interface 120 (i.e. doesn't require instruction injection to read/write). So, this register 67 can be used to share data (in both directions) between the injected debug code and the debugger. In variants of this idea, a plurality of debug data registers 67 could be provided, e.g. a separate register for each direction and/or each context, and/or multiple shared data registers 67.

In embodiments, none of the program state 26 is automatically saved by the hardware on the processor 2 upon entering the debug mode. When the debug code is executed, it could start overwriting the contents of the operand registers and/or CSRs. Without saving this state, then when returning to the operational mode, it will not be possible to pick up again where the program left off. However, in embodiments disclosed herein, no hardware needs to be provided to automatically store anything. Instead, if the debug code needs to use registers in the ordinary register file(s) 26 as temporary storage (which typically it does), then the debug code will use the debug data register(s) 67 $DBG_DATA to store the current contents out to the host machine (the terminal) 64 before trashing the contents. $DBG_DATA is then later used by the final debug code to restore the register contents from the host machine 64, before returning to the operational mode.

As mentioned, in the case of a multi-threaded processing module 4, in embodiments the debug mechanism is configured to enable only an individual selected one of the contexts (i.e. time slot plus respective set of context registers 26) to be debugged. In this case, the registers 65 in the debug interface 120 comprise a context ID register 68 which identifies one of the contexts (or strictly, one of the time slots in the barrel-threaded sequence and the corresponding set of context registers 26). This enables the debug adapter 63 to write the ID of a selected context to the debug interface 120.

Based on this, the debug interface 120 then controls the debug mode switching logic 70 to apply the debug mode only to the selected context (i.e. only in the respective time slot). In preferred embodiments, all other contexts are allowed to continue running normally (i.e. the fetch unit 14 continues to fetch instructions from memory 22 in those time slots).

Figure 7:
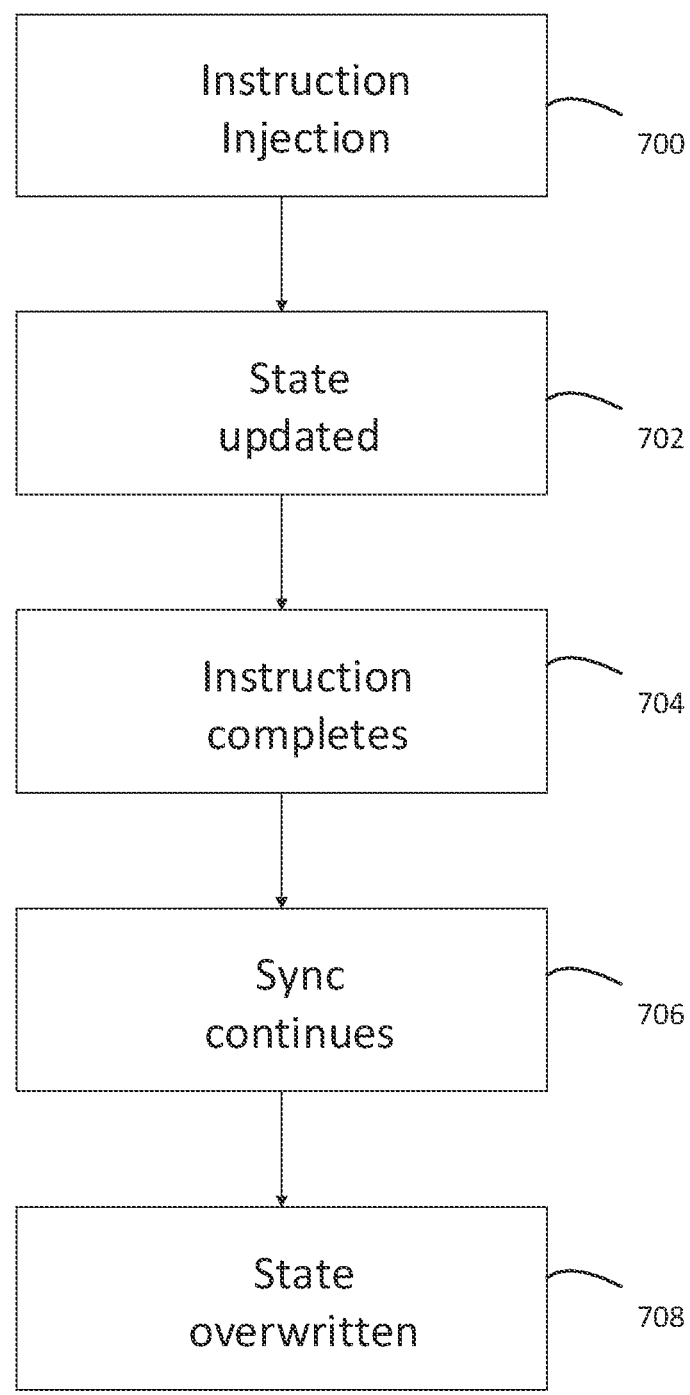
FIG. 7 is a flow diagram of state updates for an injected instruction.

As mentioned above, the SYNC instruction behaviour is dictated by a state machine at stage e5 of execution. FIG. 7 shows an example flow-chart of how the state is updated when an injected instruction is executed during a SYNC instruction. At step 700, an injected instruction is executing. At step 702, the state of the SYNC instruction is updated to reflect that the injected instruction is executing. At step 704, the injected instruction completes, and the state of the SYNC instruction is updated to reflect that no injected instruction is currently executing. If any workers are still active, the SYNC instruction resumes at step 706 and completes once all workers become inactive at step 708. This describes the aspect of the SYNC instruction's behaviour in which an injected instruction is executing. The state of the SYNC instruction may depend on other factors in addition to whether an injected instruction is executing and whether worker threads are active.

Figure 8:
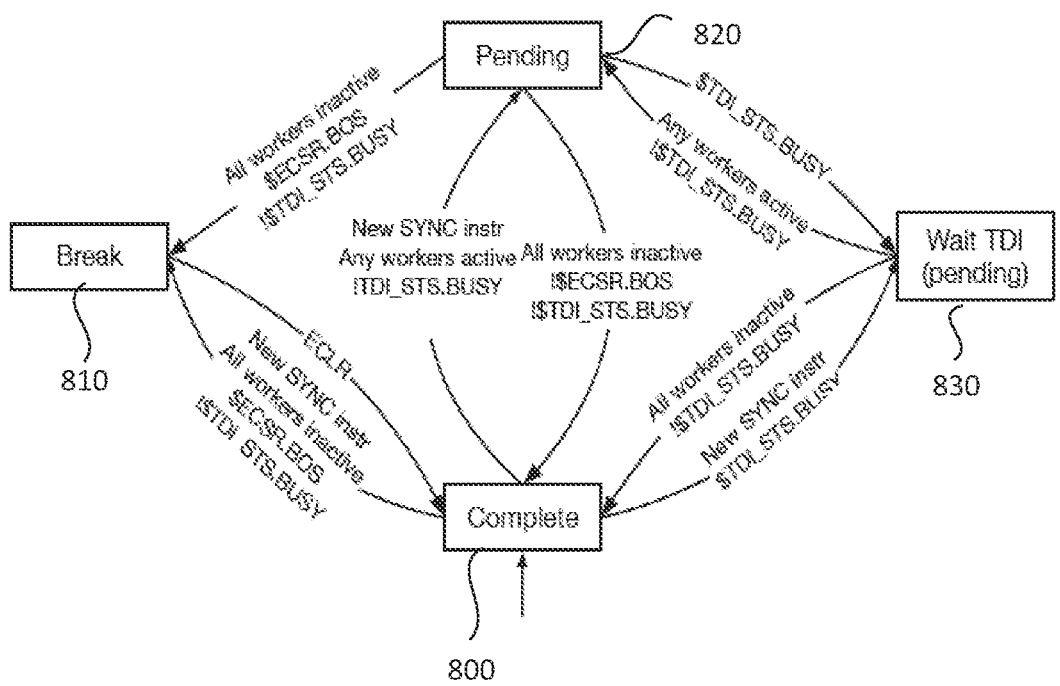
FIG. 8 is a state diagram of a sync instruction in local mode.
Figure 9:
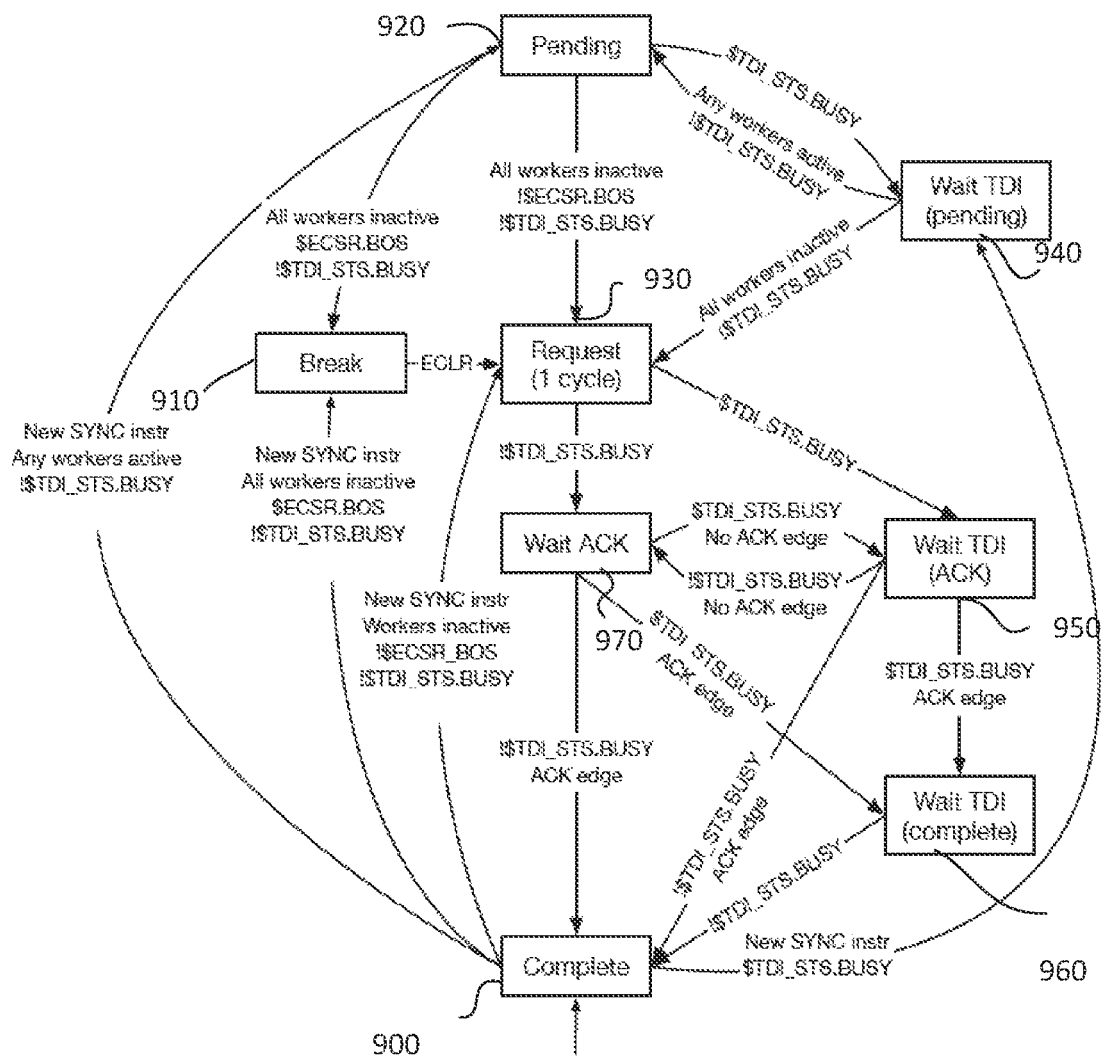
FIG. 9 is a state diagram of a sync instruction in external mode.

FIGS. 8 and 9 show example state diagrams of the SYNC instruction for local and external modes respectively. Both these diagrams show the possible states of the SYNC instruction, allowing for the possibility of a BREAK_on_Sync exception and an instruction injection outside a BREAK_on_sync. Both FIGS. 8 and 9 show a finite state machine where state transitions are dependent on one or more conditions. These conditions are set out in the table below:

| | |
|---|---|
| New SYNC instruction | A new SYNC instruction has reached the e5 stage of the pipeline. |
| Any workers active | One or more worker contexts is actively executing instructions and has not executed an EXIT. |
| $TDI_STS.BUSY | An injected instruction is in the execution pipeline (from fetch to commit in e5), indicated by a register bit. Deasserted after commit of instruction in e5. |
| $ECSR.BOS | A register bit that indicates that a BREAK_on_Sync exception event should be raised when possible. |
| ECLR | A write to the clear register occurs and the BREAK_on_Sync exception is cleared. |
| ACK edge | A SYNC acknowledgement has been received. |

FIG. 8 shows an example of a finite state machine which defines the SYNC behaviour for local mode, which includes transitions between four states:

'Pending': There are no injected instructions in the pipeline but at least one worker is active, so the SYNC is not complete.

'Break': All workers are inactive but the BREAK_on_Sync flag is set, so an exception is raised, and execution is interrupted, 'Wait TDI' (pending): An injected instruction is in the pipeline, so SYNC is not complete.

'Complete': All workers are inactive and/or ACK received, and no injected instructions are currently in the pipeline so SYNC is complete.

In the absence of either an injected instruction or BREAK_on_sync, the SYNC moves only along the centre of the state diagram between 'Pending' and 'Complete' states. If a BREAK_on_Sync flag is set or an instruction is injected into the pipeline, then the respective 'Break' and 'Wait TDI' states are also used.

As described above, the SYNC instruction takes a mode as an operand, where one possible mode is 'local', which refers to a sync of worker threads on the same processor module (e.g. tile) as the supervisor in which the sync instruction is executed.

An example scenario of a SYNC instruction in local mode is now described with reference to FIG. 8. The supervisor starts in the 'Complete' state 800. In this example scenario, an instruction to set a register value may be injected into the pipeline via a debug injection. A SYNC instruction may be issued, while workers are running. The 'TDI_STS.BUSY' flag is true since there is an injected instruction in the pipeline. The conditions to move to the 'WAIT TDI' state 830 are therefore satisfied, and the SYNC moves into this state 830. The injected instruction completes, and the register value is set. If workers are still active, the SYNC transitions to the 'Pending' state 820. If all workers become inactive but a second instruction is injected in the same cycle, then according to the state diagram in the example of FIG. 8, the SYNC transitions to the 'WAIT TIN' state 830 again. Once the injected instruction completes, the 'TDI_STS.BUSY' condition switches to false, and the workers are inactive, so the SYNC transitions to the 'Complete' state 800.

FIG. 9 shows the state diagram for an example SYNC EXTERNAL mode. This mode relates to a sync over multiple tiles on the chip. Each tile sends a sync request once all workers of that tile are inactive, and when a sync acknowledgement has been received from the sync controller, which indicates that all tiles have reached a sync point, then the external SYNC state transitions to complete. Sync request and sync acknowledgement are described in more detail later.

The example of FIG. 9 includes a number of states for the external SYNC instruction. States 'Complete', 'Pending', and 'Break' have the same meaning as the corresponding states for local mode. External mode introduces a 'Request' state and a number of extra 'Wait' states:

Request (1 cycle): The local workers are all inactive, so a sync request is sent to the other tiles to request an acknowledgement when all tiles have reached a local sync point.

Wait TDI (pending): An injected instruction is in the pipeline so a sync request cannot be issued.

Wait TDI (ACK): A sync request has been issued but an injected instruction is in the pipeline, and SYNC is waiting for an acknowledgement and for the injection to complete.

Wait ACK: No instruction injection is in the pipeline but SYNC is waiting for a sync acknowledgement.

Wait TDI (complete): A sync acknowledgement has been received and SYNC is waiting for the injection to complete.

In an example scenario, a new SYNC instruction reaches e5 of the pipeline, no receive exceptions have been logged and no injected instructions are currently in the pipeline. Some workers are still active. The SYNC state moves from 'Complete' 900 to 'Pending' 920. The BREAK_on_Sync flag is set to true, so when all workers become inactive, the state transitions to 'Break' 910 as an exception is raised. The BREAK_on_Sync instruction may be cleared, allowing the SYNC to transition to the 'Request' state, sending out a sync request. If an instruction has been injected into the pipeline, the SYNC transitions to a 'Wait TDI (ACK)' state 950, The SYNC waits in this state for both the sync acknowledgement and for the injection to complete. If the injection completes and the sync acknowledgement is received in the same cycle, the state is directly updated to 'Complete' 900.

An advantage of the described technique is related to the verification of the tile processor.

The behaviour of SYNC in the presence of instruction injection is well defined, so that, for example, if injection is attempted without BREAK_on_sync set, there are no unexpected effects, such as the machine hanging.

There follows a fuller explanation of a processor in which the SYNC instruction may be implemented.

As mentioned, in embodiments the processor module 4 may be implemented as one of an array of interconnected tiles forming a multi-tile processor, wherein each of the tiles may be configured as described above in relation to FIGS. 1 to 4.

This is illustrated further in the example of FIG. 5 which shows a single chip processor 2, i.e. a single die, comprising an array 6 of multiple processor tiles 4 and an on-chip interconnect 34 connecting between the tiles 4. The chip 2 may be implemented alone on its own single-chip integrated circuit package, or as one of multiple dies packaged in the same IC package. The on-chip interconnect may also be referred to herein as the "exchange fabric" 34 as it enables the tiles 4 to exchange data with one another. In examples, each tile 4 comprises a respective instance of the barrel-threaded processing unit 10 and memory 11, each arranged as described above in relation to FIGS. 1 to 4. For instance, by way of illustration the chip 2 may comprise of the order of hundreds of tiles 4, or even over a thousand. For completeness, note also that an "array" as referred to herein does not necessarily imply any particular number of dimensions or physical layout of the tiles 4.

In embodiments, each chip 2 also comprises one or more external links 8, enabling the chip 2 to be connected to one or more, external processors on different chips (e.g. one or more other instances of the same chip 2). These external links 8 may comprise any one or more of: one or more chip-to-host links for connecting the chip 2 to a host processor, and/or one or more chip-to-chip links for connecting together with one or more other instances of the chip 2 on the same IC package or card, or on different cards. In one example arrangement, the chip 2 receives work from a host processor (not shown) which is connected to the chip via one of the chip-to-host links in the form of input data to be processed by the chip 2. Multiple instances of the chip 2 can be connected together into cards by chip-to-chip links. Thus, a host may access a computer which is architected as a single chip processor 2 or as multiple single chip processors 2 possibly arranged on multiple interconnected cards, depending on the workload required for the host application.

The interconnect 34 is configured to enable the different processor tiles 4 in the array 6 to communicate with one another on-chip 2. However, as well as there potentially being dependencies between threads on the same tile 4, there may also be dependencies between the portions of the program running on different tiles 4 in the array 6. A technique is therefore required to prevent a piece of code on one tile 4 running ahead of data upon which it is dependent being made available by another piece of code on another tile 4.

Figure 10:
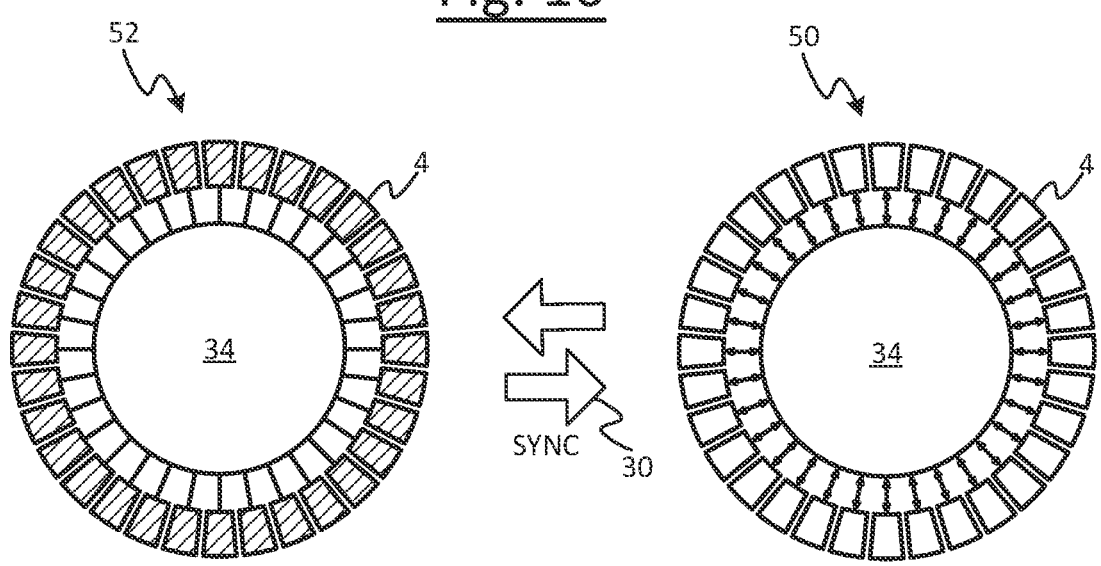
FIG. 10 is a schematic illustration of a bulk synchronous parallel (BSP) computing model.
Figure 11:
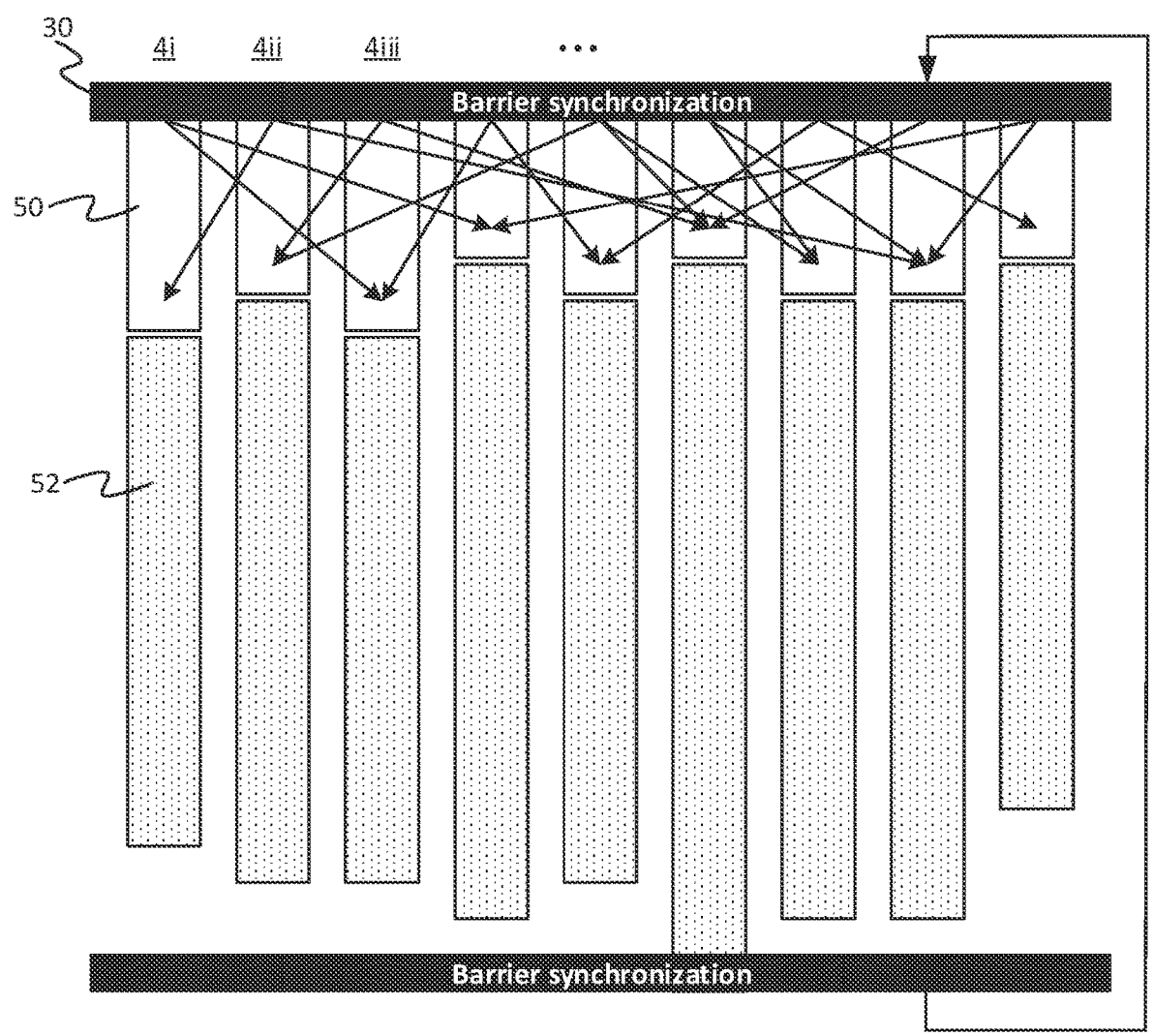
FIG. 11 is another schematic illustration of a BSP model.

In embodiments, this is achieved by implementing a bulk synchronous parallel (BSP) exchange scheme, as illustrated schematically in FIGS. 10 and 11.

According to one version of BSP, each tile 4 performs a compute phase 52 and an exchange phase 50 in an alternating cycle, separated from one to the other by a barrier synchronization 30 between tiles. In the case illustrated a barrier synchronization is placed between each compute phase 52 and the following exchange phase 50. During the compute phase 52 each tile 4 performs one or more computation tasks locally on-tile, but does not communicate any results of these computations with any others of the tiles 4. In the exchange phase 50 each tile 4 is allowed to exchange one or more results of the computations from the preceding compute phase to and/or from one or more others of the tiles in the group, but does not perform any new computations until it has received from other tiles 4 any data on which its task(s) has/have dependency It is not excluded that other operations such as internal control-related operations may be performed in the exchange phase. In embodiments the exchange phase 50 does not include any non-time-deterministic computations, but a small number of time-deterministic computations may optionally be allowed during the exchange phase 50. Note also that a tile 4 performing computation may be allowed during the compute phase 52 to communicate with other external system resources external to the array of tiles 4 being synchronized e.g. a network card, disk drive, or field programmable gate array (FPGA)—as long as this does not involve communication with other tiles 4 within the group being synchronized. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phases 52 into the exchange phase 50, or the juncture transitioning from the exchange phases 50 into the compute phase 52, or both. That is to say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions are enforced. In all three variants it is the individual processors which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

FIG. 11 illustrates an example in which the BSP principle as implemented amongst a group 4*i*, 4*ii*, 4*iii* of some or all of the tiles in the array 6, in the case which imposes: (a) a barrier synchronization from compute phase 52 to exchange phase 50 (see above). Note that in this arrangement, some tiles 4 are allowed to begin computing 52 whilst some others are still exchanging.

According to embodiments disclosed herein, this type of BSP may be facilitated by incorporating additional, special, dedicated functionality into a machine code instruction for performing barrier synchronization, i.e. the SYNC instruction.

In embodiments, the SYNC function takes this functionality when qualified by an inter-tile is mode as an operand, e.g. the on-chip mode: SYNC chip.

The execution unit (EXU) of the execution stage 18 is configured so as, in response to the opcode of the SYNC instruction, when qualified by the on-chip (inter-tile) operand, to cause the supervisor thread in which the "SYNC chip" was executed to be paused until all the tiles 4 in the array 6 have finished running workers. This can be used to implement a barrier to the next BSP superstep. I.e. after all tiles 4 on the chip 2 have passed the barrier, the cross-tile program as a whole can progress to the next exchange phase 50.

Once the supervisor has launched all of the threads which it intends to run in the current compute cycle 52, it then executes a SYNC instruction. This triggers the following functionality to be triggered in dedicated synchronization logic 39 on the tile 4, and in a synchronization controller 36 implemented in the hardware interconnect 34. This functionality of both the on-tile sync logic 39 and the synchronization controller 36 in the interconnect 34 is implemented in dedicated hardware circuitry such that, once the SYNC instruction is executed, the rest of the functionality proceeds without further instructions being executed to do so.

Firstly, the on-tile sync logic 39 causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then depending on the status of the BREAK-on-Sync flag, the sync logic 39 sends a synchronization request "sync_req" to the synchronization controller 36 in the interconnect 34. The local tile 4 then continues to wait with the supervisor instruction issue paused. A similar process is also implemented on each of the other tiles 4 in the array 6 (each comprising its own instance of the sync logic 39). Thus at some point, once all the final workers in the current compute phase 52 have EXITed on all the tiles 4 in the array 6, the synchronization controller 36 will have received a respective synchronization request (sync_req) from all the tiles 4 in the array 6 that are not subject to an exception. The chip is 'paused' until exceptions have been cleared, and the sync_req issued from cleared tiles. Only then, in response to receiving the sync_req from every tile 4 in the array 6 on the same chip 2, the synchronization controller 36 sends a synchronization acknowledgement signal "sync_ack" back to the sync logic 39 on each of the tiles 4. Up until this point, each of the tiles 4 has had its supervisor instruction issue paused waiting for the synchronization acknowledgment signal (sync_ack). Upon receiving the sync_ack signal, the sync logic 39 in the tile 4 automatically unpauses the supervisor instruction issue for the respective supervisor thread on that tile 4. The supervisor is then free to proceed with exchanging data with other tiles 4 via the interconnect 34 in a subsequent exchange phase 50.

Preferably the sync_req and sync_ack signals are transmitted and received to and from the synchronization controller, respectively, via one or more dedicated sync wires connecting each tile 4 to the synchronization controller 36 in the interconnect 34.

Figure 12:
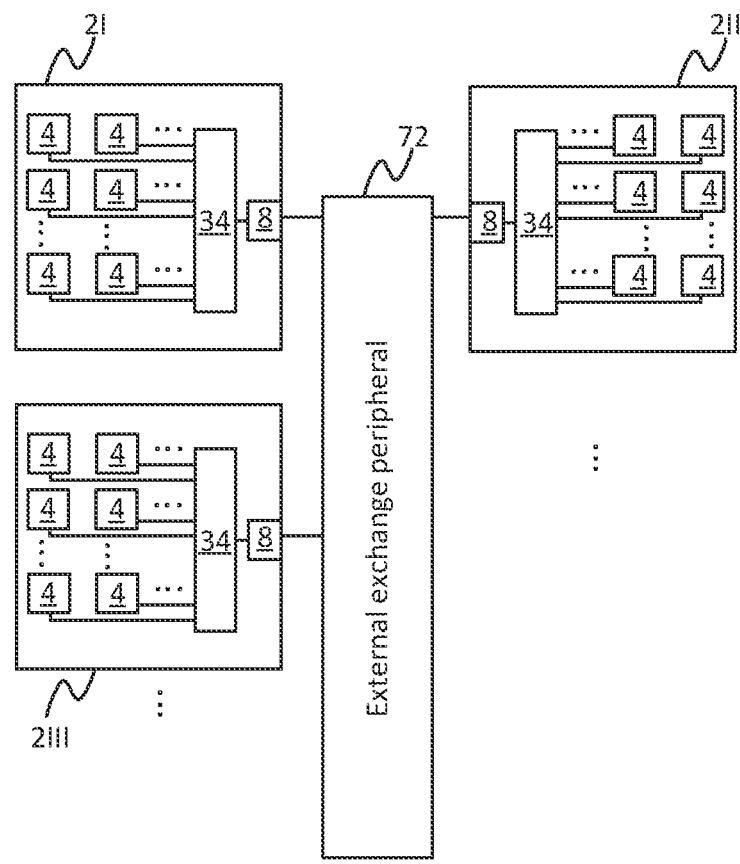
FIG. 12 is a schematic illustration of system of multiple interconnected processor chips.

As mentioned previously, in embodiments multiple instances of the chip 2 can be connected together to form an even larger array of tiles 4 spanning multiple chips 2. An example is illustrated in FIG. 12. Some or all of the chips 2 may be implemented on the same IC package or some or all of the chips 2 may be implemented on different IC packages. The chips 2 are connected together by an external interconnect 72 (via the external links 8 shown in FIG. 5). As well as providing a conduit for exchange of data between tiles 4 on different chips, the external exchange peripheral 72 also provides hardware support for performing barrier synchronization between the tiles 4 on different chips 2.

In embodiments, the SYNC instruction can take at least one further possible value of its mode operand to specify an external, i.e. inter-chip, synchronization: SYNC zone_n, wherein zone_n represents an external sync zone. The external interconnect 72 comprises similar hardware logic to that described in relation to FIG. 11, but on an external, inter-chip scale. When the SYNC instruction is executed with an external sync zone of two or more chips 2 specified in its operand, this causes the logic in the external interconnect 72 to operate in a similar manner to that described in relation to the internal interconnect 34, but across the tiles 4 on the multiple different chips 2 in the specified sync zone.

That is, in response to an external SYNC, the supervisor instruction issue is paused until all tiles 4 on all chips 2 in the external sync zone have completed their compute phase 52, are not subject to an exception and submitted a sync request. Further, logic in the external interconnect 72 aggregates the local exit states of all these tiles 4, across the multiple chips 2 in the zone in question. Once all tiles 4 in the external sync zone have made the sync request, the external interconnect 72 signals a sync acknowledgment back to the tiles 4. In response to the sync acknowledgement, the tiles 4 on all the chips 2 in the zone resume instruction issue for the supervisor.

In embodiments the functionality of the interconnect 72 may be implemented in the chips 2, i.e. the logic may be distributed among the chips 2 such that only wired connections between chips are required (FIG. 12 is schematic).

All tiles 4 within the mentioned sync zone are programmed to indicate the same sync zone via the mode operand of their respective SYNC instructions. In embodiments the sync logic in the external interconnect 72 peripheral is configured such that, if this is not the case due to a programming error or other error (such as a memory parity error), then some or all tiles 4 will not receive an acknowledgement, and therefore that the system will come to a halt at the next external barrier, thus allowing a managing external CPU (e.g. the host) to intervene for debug or system recovery. In other embodiments an error is raised in the case where the sync zones do not match. Preferably however the compiler is configured to ensure the tiles in the same zone all indicate the same, correct sync zone at the relevant time.

Where reference is made to a sequence of interleaved time slots, or the like, this does not necessarily imply that the sequence referred to makes up all possible or available slots. For instance, the sequence in question could be all possible slots or only those currently active. It is not necessarily precluded that there may be other potential slots that are not currently included in the scheduled sequence.

The term tile as used herein does not necessarily limit to any particular topography or the like, and in general may refer to any modular unit of processing resource, comprising a processing unit 10 and corresponding memory 11, in an array of like modules, typically at least some of which are on the same chip (i.e. same die).

Further, the scope of the present disclosure is not limited to a time-deterministic internal interconnect or a non-time-deterministic external interconnect. The synchronization and debug mechanisms disclosed herein can also be used in a completely time-deterministic arrangement, or a completely non-time-deterministic arrangement.

Other applications and variants of the disclosed techniques may become apparent to a person skilled in the art once given the disclosure herein. The scope of the present disclosure is not limited by the described embodiments but only by the accompanying claims.

The invention claimed is:

1. A processor comprising:
an execution unit comprising an execution pipeline having multiple execution stages configured to execute machine code instructions to implement functional behaviour of the machine code instructions, a first machine code instruction requiring multiple cycles of pipeline operation for execution;
instruction memory holding the machine code instructions for execution, wherein the execution unit is configured to access the instruction memory to fetch the first machine code instruction for execution in the execution pipeline; and
an instruction injection mechanism configured to inject a second machine code instruction into the execution pipeline during execution of the first machine code instruction in one of the multiple execution stages of the execution pipeline;
the execution pipeline configured to pause execution of the first machine code instruction at the one of the multiple execution stages in the execution pipeline, to execute the second machine code instruction to termination in the execution pipeline, to detect termination of the second machine code instruction and to automatically recommence execution of the first machine code instruction by the execution pipeline on detection of termination of the second machine code instruction.

2. The processor of claim 1 wherein the machine code instructions comprise a plurality of worker threads for execution in a respective one of a plurality of time slots and a supervisor thread, and wherein the supervisor thread comprises the first machine code instruction.

3. The processor of claim 1 wherein the first machine code instruction is configured to enter an operational wait state after at least a first cycle of pipeline operation to await an execution condition for further execution.

4. The processor of claim 3 wherein the first machine code instruction comprises a synchronisation instruction which issues a synchronisation request in response to determining the execution condition.

5. The processor of claim 1, wherein the first machine code instruction is configured to enter an operational wait state after at least a first cycle of execution to await an execution condition for further execution, and wherein the first machine code instruction comprises a synchronisation instruction which defines a local mode in which the execution condition comprises termination of a set of worker threads currently being executed in respective timeslots.

6. The processor of claim 1, wherein the first machine code instruction comprises a synchronisation instruction which issues a synchronisation request when an execution condition is determined, further wherein the processor is configured to transmit the synchronisation request to another processor and to await receipt of a synchronisation acknowledgement signal.

7. The processor of claim 1 wherein the execution unit is configured to adopt an injection wait state when the execution of the first machine code instruction has been paused and to set an indicator to indicate a paused state.

8. The processor of claim 7 wherein the execution unit is configured on detection of termination of the second machine code instruction to reset the indicator to a ready state.

9. The processor of claim 8 wherein the execution unit is configured to monitor the indicator and to automatically recommence execution of the first machine code instruction in response to the indicator being in the ready state.

10. The processor of claim 1 wherein the second machine code instruction is a debugging instruction for debugging the processor.

11. The processor of claim 10 wherein the debugging instruction is configured, when executed by the execution unit, to record an execution state associated with a third machine code instruction executed by the execution unit.

12. A method of executing instructions in a processor, the method comprising:
fetching a first instruction from a memory of the processor, the first instruction requiring multiple cycles for execution;
commencing execution of the first instruction in an execution pipeline of the processor, the execution pipeline having multiple execution stages configured to execute the first instruction to implement functional behaviour of the first instruction;
receiving in the execution pipeline a second instruction during execution of the first instruction in one of the multiple execution stages of the execution pipeline;
pausing execution of the first instruction in the execution pipeline;
executing the second instruction to termination; and
automatically recommencing execution of the first instruction on detection of termination of the second instruction.

13. The method of claim 12 wherein in one of the cycles of the first instruction, the first instruction enters an operational wait state to await an execution condition for further execution.

14. The method of claim 12, further comprising, while execution of the first instruction is paused, causing the first instruction to adopt an injection wait state to await detection of termination of the second instruction.

15. The method of claim 12, further comprising setting an indicator to indicate a paused state of the first instruction.

16. The method of claim 15, further comprising on detection of termination of execution of the second instruction, resetting the indicator to indicate a ready state and automatically recommencing execution of the first instruction.

17. A processing system comprising a first processor and a second processor and an interconnect for communicating between the first processor and the second processor, wherein:
the first processor comprises an execution unit for executing machine code instructions, including a first machine code instruction requiring multiple cycles for execution;
the interconnect is operable to conduct communications between the first processor and the second processor according to a bulk synchronous parallel scheme whereby each of the first processor and the second processor performs a local compute phase followed by an inter-processor exchange phase with the exchange phase being held back until both the first processor and the second processor have completed the compute phase, wherein the first machine code instruction comprises a synchronisation instruction for execution by the first processor upon completion of its compute phase; and
wherein the execution unit is configured:
to pause execution of the synchronisation instruction to execute an additional instruction which has been injected into the execution unit;

to detect termination of execution of the additional instruction; and to automatically recommence execution of the synchronisation instruction on detection of termination of the additional instruction.

18. The processing system of claim 17 comprising a debug interface configured to inject a debug instruction into the execution unit during execution of the synchronisation instruction.

19. The processing system of claim 17 wherein the first processor comprises:

multiple context register sets, each context register set arranged to store a program state of a respective thread; and a scheduler arranged to schedule execution of a respective one of a plurality of worker threads in each of a plurality of timeslots wherein a program state of each of the worker threads is stored in a respective one of the context register sets, wherein according to the bulk synchronous parallel scheme, the exchange phase is held back until all the worker threads on both of the first processor and second processor have issued a synchronisation request to indicate completion of the compute phase.

20. The processing system of claim 17, wherein the exchange phase is arranged to be performed by a supervisor thread separate a plurality of worker threads, wherein the supervisor thread comprises the synchronisation instruction.

21. A method performed by a processor having an execution pipeline with multiple execution stages, the method comprising:

accessing an instruction memory of the processor to fetch a first machine code instruction for execution in the execution pipeline, the first machine code instruction requiring multiple cycles of pipeline operation for execution;

injecting a second machine code instruction into the execution pipeline of the processor during execution of the first machine code instruction in one of the multiple execution stages of the execution pipeline;

pausing execution of the first machine code instruction at the one of the multiple execution stages in the execution pipeline while executing the second machine code instruction to termination in the execution pipeline; and recommencing execution of the first machine code instruction by the execution pipeline on detection of termination of the second machine code instruction.

22. The method of claim 21, further comprising: the first machine code instruction entering an operational wait state after a first cycle of execution to await an execution condition for further execution.

23. The method of claim 21, further comprising: the first machine code instruction entering an operational wait state after a first cycle of execution to await an execution condition for further execution, and wherein the first machine code instruction comprises a synchronisation instruction which defines a local mode in which the execution condition comprises termination of a set of worker threads currently being executed in respective timeslots.

24. The method of claim 21, wherein the first machine code instruction comprises a synchronisation instruction which issues a synchronisation request when an execution condition is determined, the method further comprising:

transmitting the synchronisation request to another processor and waiting for receipt of a synchronisation acknowledgement signal.

25. The method of claim 21 further comprising:

adopting an injection wait state when the execution of the first machine code instruction has been paused; and
setting an indicator to indicate a paused state.

26. The method of claim 25, further comprising:

on detection of termination of the second machine code instruction, resetting the indicator to a ready state.

27. The method of claim 26, further comprising:

monitoring the indicator, wherein recommencing execution of the first machine code instruction is in response to the indicator being in the ready state.

28. The method of claim 21, further comprising:

injecting a debugging instruction for debugging the processor.

29. The method of claim 28, further comprising:

the debugging instruction recording an execution state associated with a third machine code instruction executed by the processor.

* * * * *